T. SMALLEY.
SAFETY BRAKE BEAM HANGER.
APPLICATION FILED JAN. 3, 1916.

1,199,937.

Patented Oct. 3, 1916.

Witness

Thomas Smalley
Inventor

By
Attorneys

UNITED STATES PATENT OFFICE.

THOMAS SMALLEY, OF CHESTER, PENNSYLVANIA.

SAFETY BRAKE-BEAM HANGER.

1,199,937.  Specification of Letters Patent.  Patented Oct. 3, 1916.

Application filed January 3, 1916. Serial No. 69,763.

*To all whom it may concern:*

Be it known that I, THOMAS SMALLEY, a citizen of the United States, residing at Chester, in the county of Delaware and State of Pennsylvania, have invented new and useful Improvements in Safety Brake-Beam Hangers, of which the following is a specification.

My invention relates to a new and useful improvement in safety brake beam hangers, and has for its object to provide an exceedingly simple and effective device of this description which will permit the brake shoe of a car truck or the like to be applied to the wheel with a yielding action regardless of the direction in which the wheel may be revolving.

A further object of my invention is to so apply my improved device to the brake beam as not to interfere with the present beam hanger.

With these ends in view this invention consists in the details of construction and combination of elements hereinafter set forth and then specifically designated by the claim.

In order that those skilled in the art to which this invention appertains may understand how to make and use the same, I will describe its construction in detail, referring by numeral to the accompanying drawing forming a part of this specification, in which—

Figure 1:
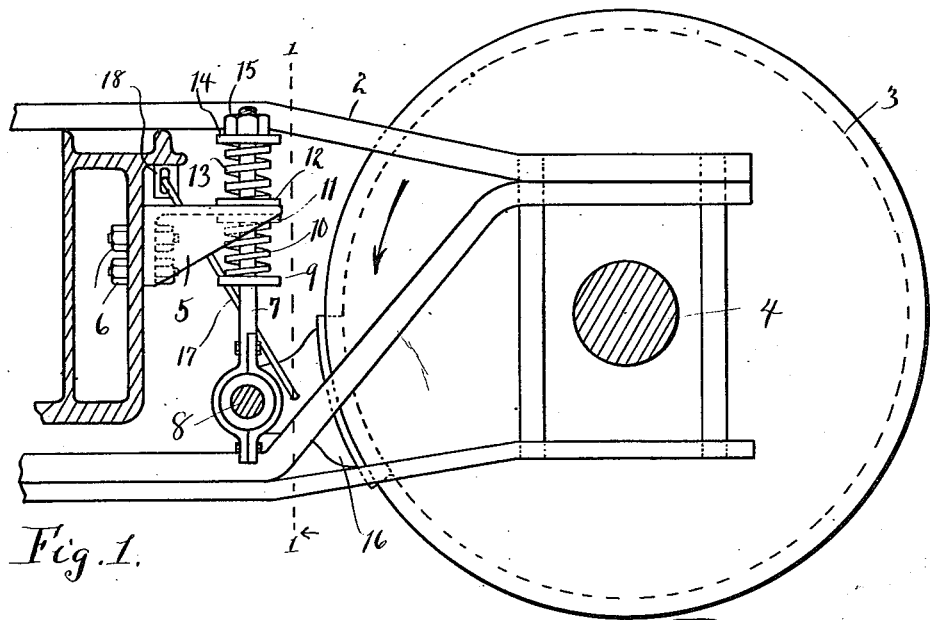
Figure 2:
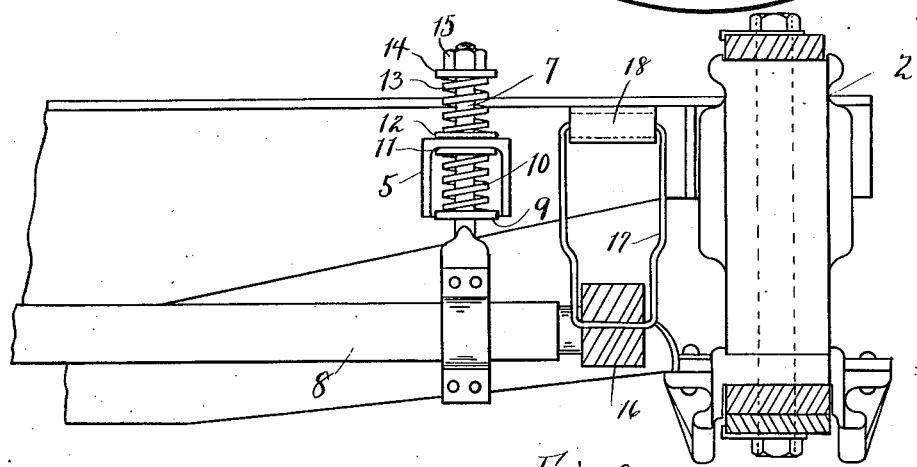
Figure 3:
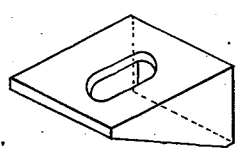

Figure 1, is a section of a portion of a car truck showing my improvements applied thereto. Fig. 2, is a section at the line 1—1 of Fig. 1, looking in the direction of the arrow; and Fig. 3, is a perspective view of the bracket.

In carrying out my invention as here embodied 2 represents the truck, 3 one of the wheels of said truck and 4 the axle thereof which are of ordinary construction. To the truck in any suitable location I secure a bracket 5 by means of the bolts 6 and through this bracket loosely passes a rod or hanger 7, to which one end of the brake beam 8 is secured, it being understood that there are two of these brackets and rods. A collar 9 is secured upon the rod 7, upon which is seated a coiled spring 10 and a washer 11 is superimposed upon said spring so as to bear upon the underside of the bracket as clearly shown. A washer 12 is seated upon the upper side of the bracket, and has a coiled spring 13 seated thereon and upon the upper end of said spring is placed a washer 14 against which the nut 15 bears, said nut being threaded upon the end of the rod. From this it will be seen that the rod will have a yielding action which forces either upward or downward.

16 represents the ordinary brake shoe which is attached to the brake beam 8 and is connected by the ordinary hanger 17, the eyes of which are enlarged lengthwise to permit them to move upon the bolt 18, the object of which is to provide for the up and down movements of the shoe which takes place when the latter is applied to the rim of the wheel on account of the spring action of the hanger rod 7.

From the foregoing description it will be seen that when the brake shoe is applied to the car wheel, it will exert a yielding pressure thereon, since said shoe is supported by the brake beam which in turn is supported by the spring cushioned hangers 7, and thus a rigid application of the brake shoes is prevented, which latter has a tendency to grind and spot the wheels. When the wheel is revolving in the direction of the arrow, marked thereon, this action will be downward, bringing into play the upper spring 13, while if the wheel is revolving in the reverse direction, the lower spring 10 will be brought into play, the hanger 17 moving up and down in the slots in the brackets 18 to permit these movements.

While I have shown my improvement as applied to a round brake beam, it of course can be applied to a square beam with like efficiency, and I do not wish to be limited to these exact details of description, as these may be varied within the limits of the appended claim without departing from the spirit of my invention.

Having thus fully described my invention, what I claim as new and useful, is—

In combination with a car truck and the wheels thereof, a brake beam carrying brake shoes, rods for supporting said beam, brackets through which said rods loosely pass, a washer seated upon the top of said bracket, and a similar washer seated upon the underside of said bracket, a collar secured upon each of the rods, a coiled spring interposed between the collar and the lower washer, a nut threaded upon the upper end of the rod, the washer lying beneath said nut, a coiled spring interposed between the last named washer and the washer upon the upper side of the bracket, hanger links pivoted to the shoes and slotted bolts for fastening the hanger links to the car truck.

In testimony whereof, I have hereunto affixed my signature in the presence of two subscribing witnesses.

THOMAS SMALLEY.

Witnesses:
RICHARD WULFF,
J. HORACE WITSIL.